T. E. DAVIS.
HOLDER FOR LUMP SUGAR, &c.
APPLICATION FILED JUNE 9, 1915.

1,206,774.

Patented Nov. 28, 1916.

Inventor:
T. E. Davis
by Wright Brown Quinby May
Attorneys

UNITED STATES PATENT OFFICE.

THOMAS E. DAVIS, OF CAMBRIDGE, MASSACHUSETTS.

HOLDER FOR LUMP-SUGAR, &c.

1,206,774. Specification of Letters Patent. Patented Nov. 28, 1916.

Application filed June 9, 1915. Serial No. 33,047.

*To all whom it may concern:*

Be it known that I, THOMAS E. DAVIS, a citizen of the United States, and resident of Cambridge, in the county of Middlesex and State of Massachusetts, have invented certain new and useful Improvements in Holders for Lump-Sugar, &c., of which the following is a specification.

The invention has for its chief object to provide, especially for use in "serve-your-self" lunch rooms, a dispensing apparatus or holder for lump sugar, adapted to contain a relatively large mass of lumps, to confine a relatively small number of the lumps in position for removal by customers, and to protect the mass of lumps from dust, insects, etc.

The invention also has for its object to enable the powdered sugar detached from the lumps by attrition and other causes, to be accumulated, saved, and protected from dust, etc., at a point below the location of the displaced lumps.

The invention consists in the improvements which I will now proceed to describe and claim.

Figure 1:
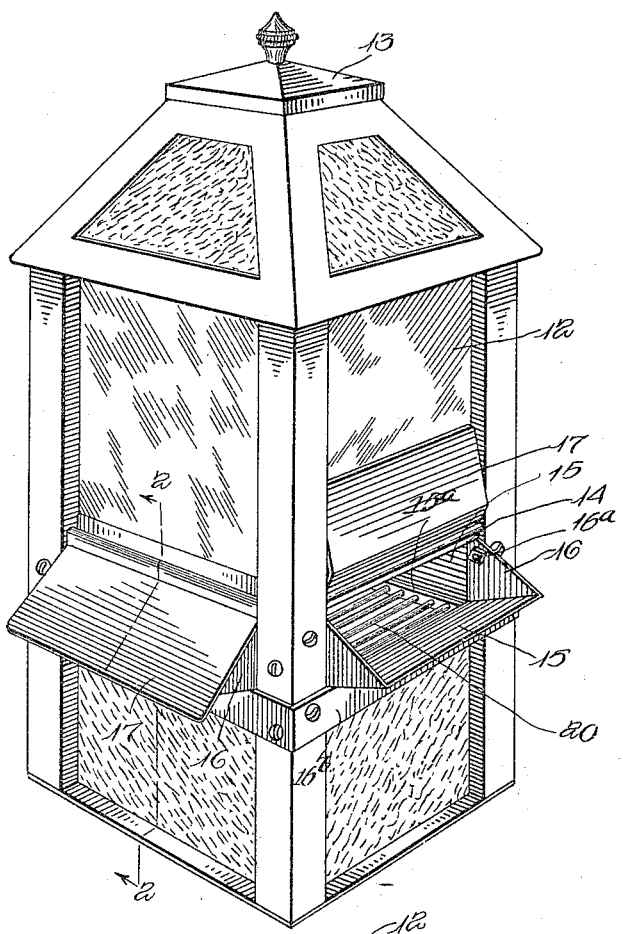
Figure 2:
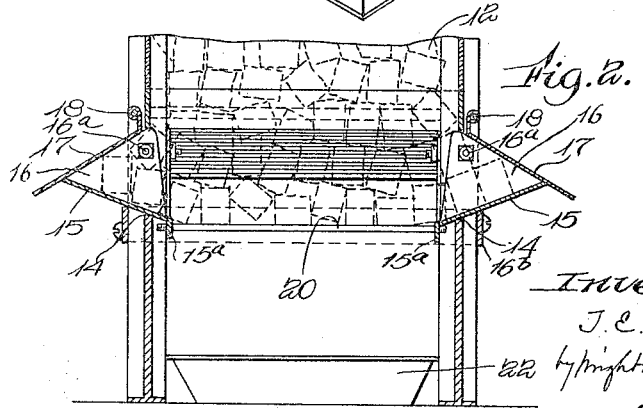

Of the accompanying drawings, forming a part of this specification,—Figure 1 represents a perspective view of a lump-sugar holder embodying my invention. Fig. 2 represents a vertical section on line 2—2 of Fig. 1.

The same reference characters indicate the same parts in all of the figures.

In the drawings, 12 represents a holder adapted to contain a mass of lumps of sugar, the holder being of any suitable form and construction, and preferably provided at its upper portion with a filling opening inclosed by a movable cover 13. As here shown, the holder is of rectangular form, and its body portion is composed of metallic corner uprights and side pieces of glass, or other suitable material, engaged therewith, the holder having a plurality of vertical sides.

In the lower portion of the holder are guarded outlets, formed to permit the outward displacement of lumps in the lower portion of the holder, and to confine the displaced lumps in position for removal by customers, without permitting the accidental escape of any of the lumps from the holder. The said guarded outlets are provided by forming horizontal openings 14, in the sides of the holder and fitting in said openings shelves 15, which project outwardly and upwardly from the lower edges of the openings. Each shelf is provided at its ends with vertical wings 16, attached to two of said corner uprights by fastening members 16$^a$, said shelf and wings being preferably made of sheet metal, which is nickeled, or otherwise protected and ornamented.

The width, projection and inclination of the shelves 15, and the height of the openings 14 are such that a relatively small number of lumps of sugar contained in the holder are permitted to be displaced outwardly by the pressure upon them of the upper portion of the mass of lumps, the displaced lumps resting on the shelves in such position that they can be conveniently removed by customers, the lumps being confined, however, by the shelves and their wings 16 against accidental removal or escape.

The outer edges of each shelf 15 and its wings 16 collectively constitute an inclined seat for a cover 17, preferably of sheet metal hinged at 18 to corner uprights of the holder. Said seat is located outside the position occupied by displaced lumps resting on the shelf 15, so that the cover is not prevented from closing by said lumps, hence, when the cover is closed and displaced lumps are protected against contamination.

The cover and its hinge are preferably so arranged relatively to each other and to the side of the holder, that the cover will remain open by gravity, as indicated by Fig. 1.

Each shelf 15, its wings 16 and the accompanying cover 17 constitute a closure for the opening 14, preventing the entrance of dust when the cover is closed. The shelves are securely supported by the fastening members 16$^a$ and by stop members or bars 16$^b$ attached to the holder and bearing on the under sides of the shelves.

To provide for the separation of loose granulated or powdered sugar that may be detached from the lumps in the holder, I provide the holder with a foraminous bottom or grid composed of parallel metal rods 20, suitably spaced apart and secured at their ends to downwardly projecting flanges 15$^a$ formed on the inner edges of two opposite shelves 15, as shown by Fig. 2. Said bottom separates the lump-containing portion of the holder from the lower or base portion, which constitutes a storage portion and may contain a receptacle 22, for the powdered sugar falling through the bottom 20. The lower portion of the holder is preferably bottomless, as indicated by Fig. 2, so that the receptacle 22 rests on the table which supports the holder, access to said receptacle being obtained by lifting the holder from the table. If desired, however, the lower portion of the holder may have a suitable opening through which the receptacle 22 may be removed, said opening being provided with a removable cover, if desired.

Each of the sides of the holder is provided with a guarded outlet, of the above-described construction. The flanges $15^a$ formed on the inner edges of two opposite shelves, and the grid rods 20 attached to said rods constitute a simple form of grid which is located wholly within the holder, so that dust is excluded from the powdered sugar receptacle by the covers 17 when they are closed, and by a mass of lumps resting on the grid whether the covers are closed or not. The desirability of thus protecting the powdered sugar will be apparent when the fact is considered that it accumulates slowly, and usually remains in the holder much longer than a charge of lumps above the grid, so that unless the powdered sugar is protected as described, its value is liable to be decreased by an admixture of dust.

It will be seen that the inclination of the shelf 15 upwardly and outwardly from the lower edge of the outlet opening, enables said shelf to act as a dam, preventing the overflow, or automatic-accidental escape of the outwardly displaced lumps, and as a guide permitting the lumps to be removed by sliding them outwardly on the shelf, so that the customer is enabled to secure a lump by placing a finger on it and drawing the lump outwardly until it projects sufficiently over the outer edge of the shelf to be grasped between the customer's finger and thumb. It is therefore unnecessary for the customer to grasp and lift the lump while it is in the restricted space bounded by the shelf 15, wings 16, and the upper edge of the opening 14.

Each winged shelf 15 bears on the lower edge and both ends of the horizontally elongated opening formed in a side of the holder, the body of the shelf bearing on said lower edge and the wings 16 on said ends. The upper edges of the wings 16 are flush at their lower ends with the outer edge of the shelf and are inclined relatively to the shelf so that the cover 17 when closed bears simultaneously on the said shelf and wing edges, which form a cover seat. The relative inclination of the shelf and the upper edges of the wings is such that when the inner edge of the shelf bears on the lower edge of the holder opening, and the wings are attached by fastening members $16^a$ to the portions of the holder forming the ends of the opening, the shelf is inclined upwardly and the upper edges of the wings are inclined downwardly, hence the shelf and wings are secured by first inserting them in the opening and then applying the fastening members.

It is obvious that the described holder may contain and permit the removal of articles other than lumps of sugar.

I claim:—

A lump holder having a substantially flat and horizontal lump-holding grate dividing the interior of said holder into two parts, said holder being provided with elongated horizontal openings above and adjacent opposite edges of said grate, shelves formed to enter said openings and bear on the lower edges thereof, said shelves being provided at their opposite ends with wings formed to bear on the opposite ends of said openings, fastening means maintaining the shelves inclined upwardly from the holder, the members forming said lump-holding grate being attached to the shelves and supported thereby, and a cover hinged to the holder above each of said openings and arranged to cover the same, said holder being formed to permit particles falling through said grate to drop directly into a removable receiver therebeneath.

In testimony whereof I have affixed my signature, in presence of two witnesses.

THOMAS E. DAVIS.

Witnesses:
C. F. BROWN,
P. W. PEZZETTI.

Copies of this patent may be obtained for five cents each, by addressing the "Commissioner of Patents, Washington, D. C."